US007080328B1

(12) United States Patent
Sawyer

(10) Patent No.: US 7,080,328 B1
(45) Date of Patent: Jul. 18, 2006

(54) GRAPHICAL USER INTERFACE FOR FILTERING A POPULATION OF ITEMS

(75) Inventor: Brian N. Sawyer, Santa Monica, CA (US)

(73) Assignee: eBay, Inc., San Jose, CA (US)

( * ) Notice: Subject to any disclaimer, the term of this patent is extended or adjusted under 35 U.S.C. 154(b) by 309 days.

(21) Appl. No.: 09/821,504

(22) Filed: Mar. 28, 2001

(51) Int. Cl.
*G06F 3/14* (2006.01)
*G06F 17/30* (2006.01)

(52) U.S. Cl. ............. 715/853; 715/968; 715/769; 707/5; 707/4; 705/36

(58) Field of Classification Search ........... 345/968, 345/853, 835, 769, 770, 751, 759, 744, 745, 345/747, 841, 700; 707/104.1, 5, 4, 2, 3; 705/36, 37; 715/700
See application file for complete search history.

(56) References Cited

U.S. PATENT DOCUMENTS 5,668,966 A  *  9/1997  Ono et al. ............... 345/853
5,894,311 A  *  4/1999  Jackson ................ 345/853 X
6,085,187 A  *  7/2000  Carter et al. ................ 707/3
6,223,145 B1 *  4/2001  Hearst ..................... 707/5 X
6,308,175 B1 * 10/2001  Lang et al. .............. 707/5 X
6,418,429 B1 *  7/2002  Borovoy et al. ............ 707/3
6,598,042 B1 *  7/2003  Kienan ...................... 707/3
6,925,608 B1 *  8/2005  Neale et al. ............ 715/853 X

* cited by examiner

*Primary Examiner*—Raymond J. Bayerl
(74) *Attorney, Agent, or Firm*—Schwegman, Lundberg, Woessner & Kluth P.A.

(57) ABSTRACT

Graphical user interface for filtering a population of items. The graphical user interface may be implemented as a method on a system comprising a computer server or other computing device. The system defines a library of available criteria to be used in filtering a population of items to identify items of interest. Each criterion has a graphical representation. The system receives an indication of at least one of the criterion to be applied to the population as a filter and also accepts an indication of a tier of the filter to which the selected criterion is to be associated. The system identifies a list of items of interest satisfying a current set of criteria defining the filter. A graphical representation of the filter is displayed by the system while it is being constructed by the user. In one embodiment, the items are securities such as stocks.

17 Claims, 3 Drawing Sheets

GRAPHICAL USER INTERFACE FOR FILTERING A POPULATION OF ITEMS

BACKGROUND

1. Field of the Invention

The invention relates to graphical user interfaces. More specifically, the invention relates to a graphical user interface for filtering a population of items.

2. Background of the Invention

When presented with a large population of items such as hundreds, thousands, or more items, there are many ways to present these items and many ways to select a group of these items meeting a set of criteria.

Traditionally, when going to a restaurant, the population of available food items may be displayed in categories such as, for example, appetizers, salads, entrees, desserts, side dishes. Subcategories signifying the kind of flavor, style of dish, or the main ingredient are also common. Examples of the actual values (or "items") include beef, chicken, vegetarian, spicy, house specialties, etc. Because the size of this list is manageable, a restaurant patron typically has no problem mentally filtering through the population of menu choices to select those items to order for a meal.

Another example of a large population of items are the course offerings at a university. Courses are typically arranged in a school bulletin by department and then, within department, as introductory, upper level classes, and graduate classes. Other information such as lists of required courses for majors or concentrations are also provided. Although a little more complicated and extensive than a restaurant menu, a student can readily select those courses the student wishes to take by flipping through the categorized listings in a school bulletin.

Another example of a large population of items are those securities, stocks, mutual funds, and other investment products that may be available to an investor. Groups of securities include those listed on the New York Stock Exchange (NYSE), traded on the NASDAQ and the American Stock Exchange, and those comprising well known indices such as the Russell 2000, Standard & Poor's 500, etc. Stocks and mutual funds may be categorized by capitalization as large, middle, and small, as emerging growth, value, growth, high risk, low risk, or any combination of these and other categorizations. However, unlike using a restaurant menu or a school bulletin, it is more challenging to select from the population of securities or mutual funds those securities or mutual funds that meet a set of desired criteria, at least in part because there are many more possible values than present in a restaurant menu, and each value can be categorized by many more properties).

SUMMARY OF THE INVENTION

A graphical user interface for filtering a population of items is describe herein. The graphical user interface may be implemented as a method on a system comprising a computer server or other computing device. The system defines a library of possible criteria to be used in filtering a population of items to identify items of interest. Each criterion has a graphical representation. The system receives an indication of at least one of the criterion to be applied to the population as a filter and accepts an indication of a tier of the filter to which the selected criterion is to be associated. The system identifies a list of items of interest satisfying a current set of criteria defining the filter. A graphical representation of the filter is displayed by the system while it is being constructed by the user. In one embodiment, the items are securities such as stocks.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION OF THE INVENTION

Figure 1:
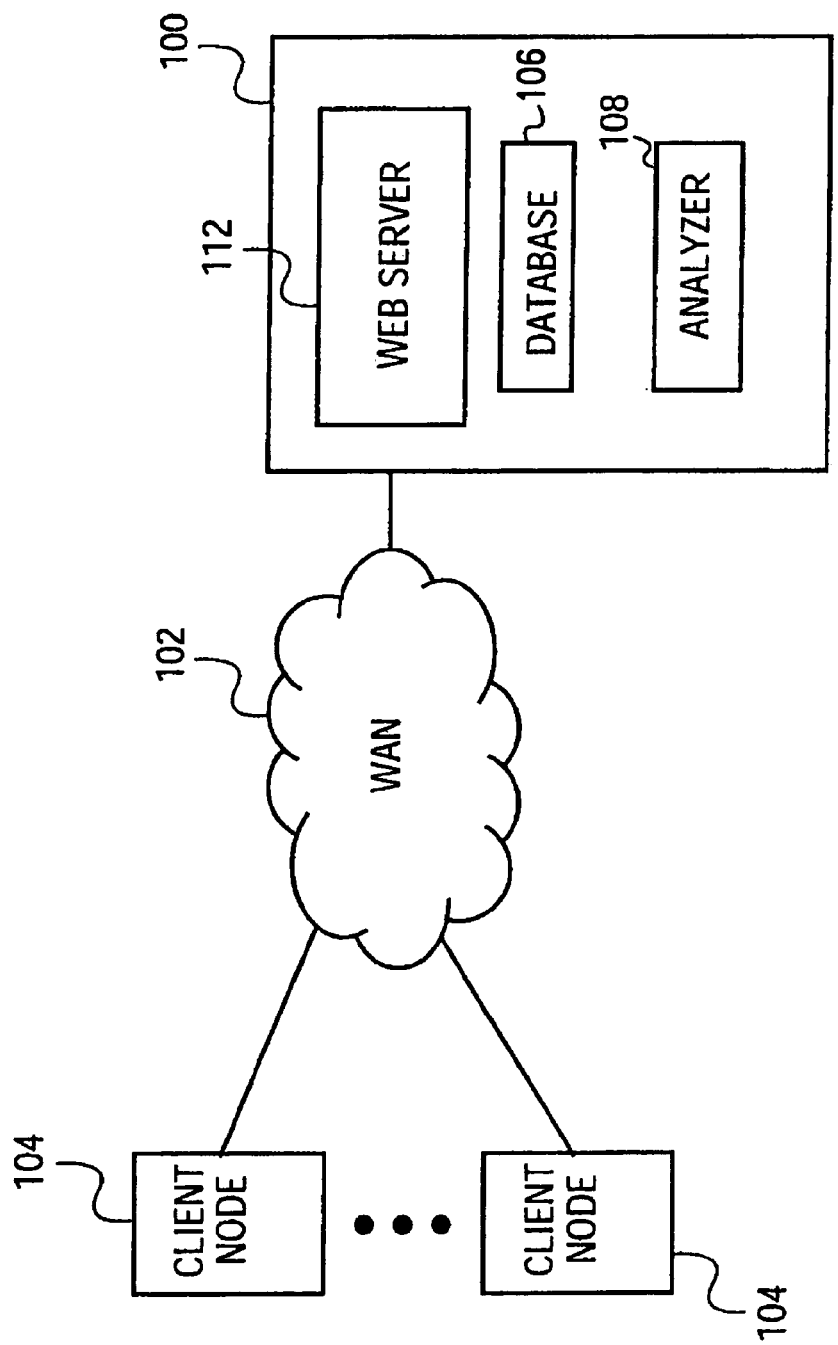
FIG. 1 is a block diagram of a system in which one embodiment of the invention may be implemented.

FIG. 1 is a block diagram of a system of in which one embodiment of the invention may be implemented. A server node 100 is coupled to a wide area network (WAN) 102 such as the Internet. The method described herein may be implemented as software on server node 100. Also coupled to WAN 102 are a plurality of client nodes 104. Client nodes 104 may be a personal computer (PC), a WAN enabled phone, a personal digital assistant (PDA), a computer tablet, a set top box, or any other computing device with which a user may connect to a WAN. Server node 100 may include database 106 and analyzer 108. The server node 100 includes web server software 112 to serve web pages, applets and information to, and to receive information from client nodes 104. The server node 100 also receives user input from client nodes 104 through WAN 102.

The server node 100 may be any server computer that includes a processor, memory, and a machine readable medium such as magnetic disk drives, optical disk drives, memory cards or sticks, flash memory devices, that may be accessed locally or remotely via any known means of communication such as WAN, local area network (LAN), via land line, satellite, or other transmission medium. Although not shown, server node 100 may be implemented in other embodiments as a cluster, grouping, LAN, etc. of servers including one or more specialized servers such as application servers, graphics servers, database servers, and the like.

The server node may provide information to users at client nodes via a web page or sequence of web pages in hypertext mark up language (HTML) that prompt the user to select and provide information, and that also display useful information to the user. Any references to prompting or providing web pages herein are achieved in this manner and may include a plurality of user interface items and user interface techniques, including, but not limited to buttons, sliders, graphics, text entry fields, JAVA® applets, and the like. Alternatively, the server node may simply be a stand alone PC running a standard executable application.

Server node 100 may store information, including a plurality of securities information and equities information in database 106. Database 106 may be a relational database such as an Oracle-style database or may include one or more of such databases. To obtain information, server node 100 may communicate with third party databases (not shown) via WAN 102 or via a direct connection.

In another embodiment, the method disclosed herein may be implemented as software on a personal computer (PC), a cellular telephone phone, a personal digital assistant (PDA), a computer tablet, a set top box, or any other computing device having a processor, memory, and machine readable medium that is, in one embodiment, capable of connecting to and communicating over a WAN.

Figure 2:
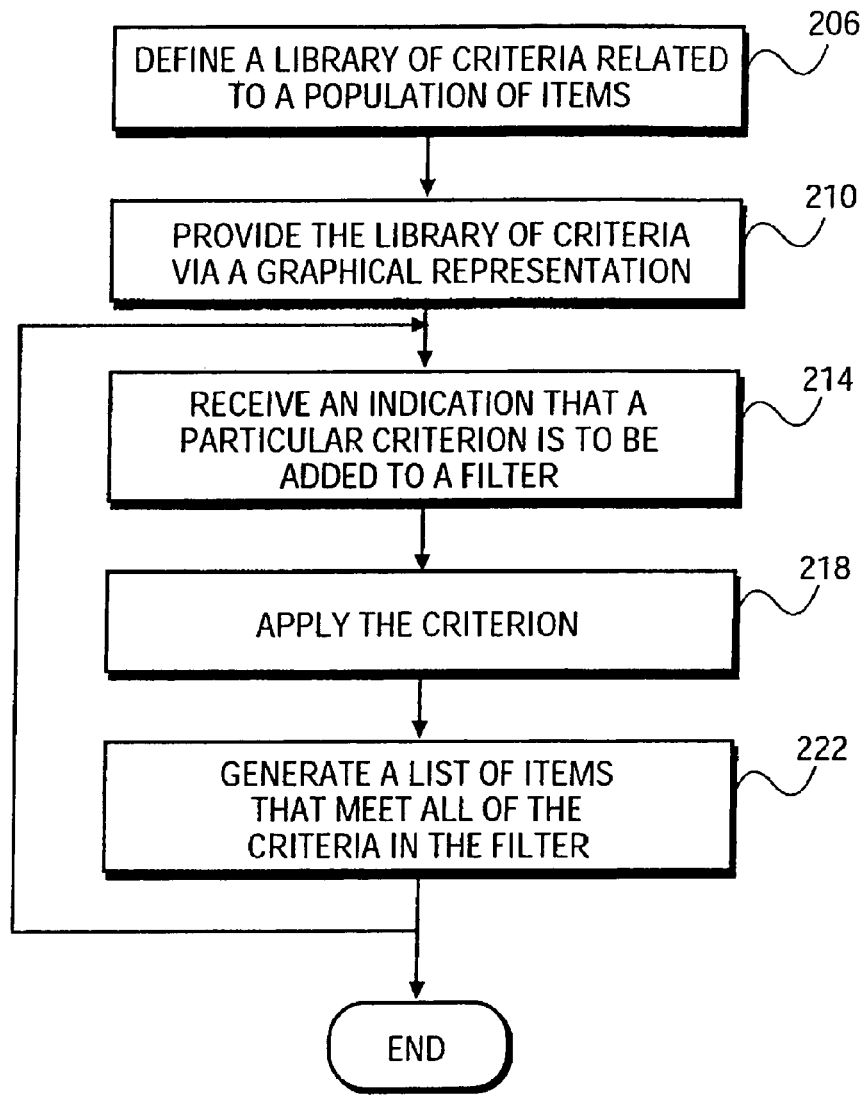
FIG. 2 is a flow diagram of operation of one embodiment of the invention.
Figure 3:
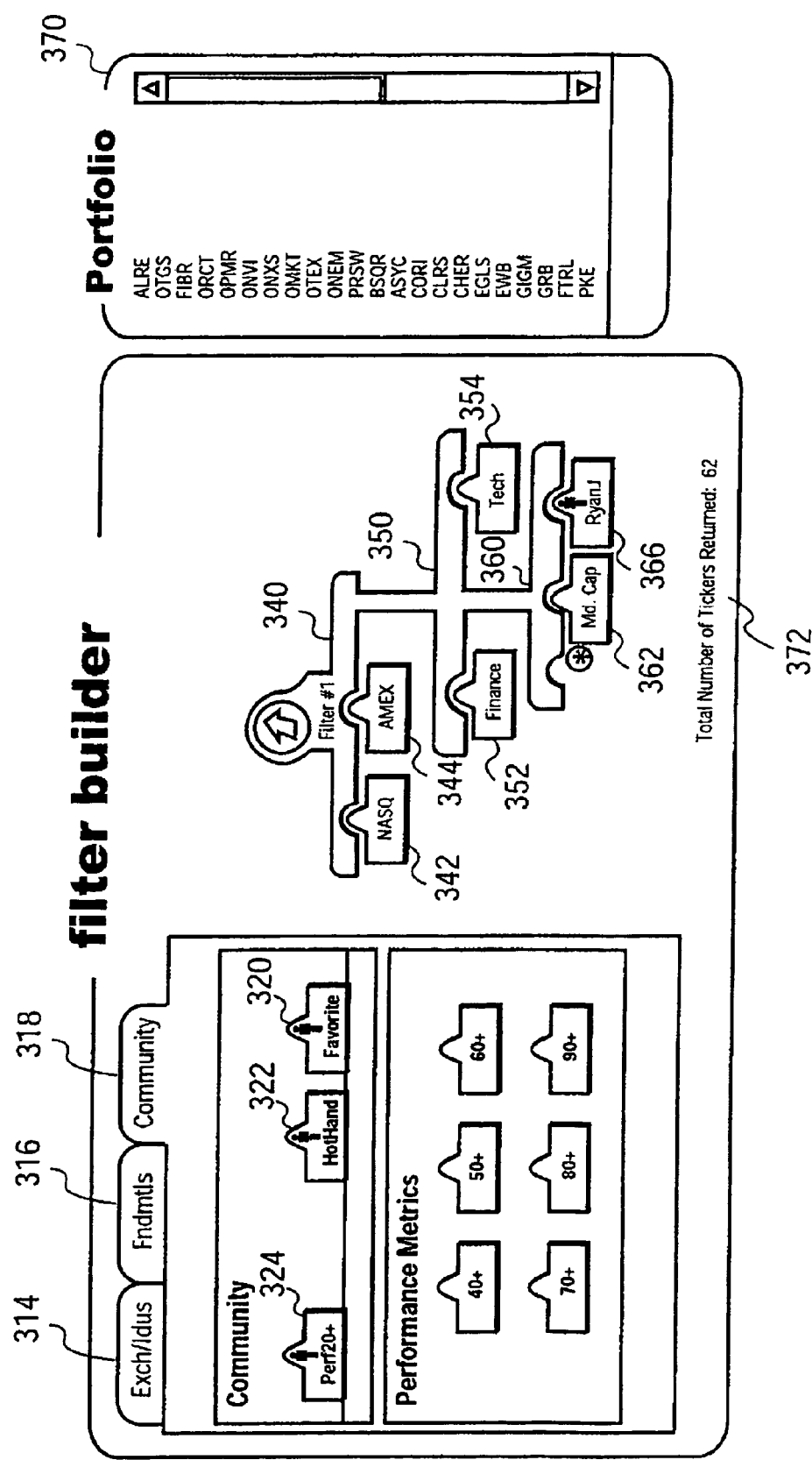
FIG. 3 is a screen image resulting from application of one embodiment of the invention.

FIG. 2 is a flow diagram of operation of one embodiment of the invention. FIG. 3 is a screen image resulting from execution of one embodiment of the invention. FIG. 3 will be referred to in describing the method set forth in FIG. 2. The method described herein involves providing a graphical user interface for filtering a population of items. The method may be implemented as software on server computer such as server node 100 described above regarding FIG. 1. The software running on a server shall be referred to herein as a system. In other embodiments, the method may be implemented in hardware or a in combination of hardware and software.

According to one embodiment of the method, the system defines a library of available criteria relating to a population of items, as shown in block 206. In one embodiment, the items may be securities or stocks. In this embodiment, the criteria may include, for example, membership in well known indices or exchanges, such as the New York Stock Exchange (NYSE), Standard & Poor's 500, NASDAQ, the Russell 2000, etc.; categorization by capitalization such as large, middle, and small, by value, by growth; dividend information such as yield or per share; pertinent sector such as technology, energy, transportation, financial, retail, etc.; well-known metrics such as beta, price to earnings ratio, debt to equity ratio, percentage or actual change in share price over a particular period of time, such as 30 day return, quarterly return, year to date return, three year return, five year return, 10 year return, etc. These criteria may be preset and defined by the system and/or may be user definable. In one embodiment, the criteria also include selections of favorite or otherwise preferred securities selected by other members of an on-line community. In one embodiment, the population of items, including descriptive information about the items, and the applicable criteria may be stored in a database, such as database 114 shown in FIG. 1. The descriptive information about the items allows for the application of the criteria as a filter and, when the items are securities, may include current share price, share prices at various dates, price to earnings ratio, categorization information, sector information, etc. In another embodiment, some or all of the population of items, including descriptive information about the items, and/or the applicable criteria may be stored remotely on other servers such as database server and application servers. These remote servers, not shown, may be implemented as part of the system described herein, or may be maintained by third parties. In yet another embodiment in which the system is a personal computer, some or all of the population of items, including descriptive information about the items, and/or the applicable criteria may be stored locally on a hard drive or other storage device.

In a related embodiment, the items may be mutual funds and the criteria may include categorization such as capitalization (small, middle, and large), value, income, growth, blend; a risk categorization; load information such as back end, front end, and none; expense ratio; minimum investment; various metrics such as a alpha, beta, R-squared, percentage change in share price over a particular period of time such as 30 day return, quarterly return, year to date return, three year return, five year return, 10 year return, etc; sectors such as technology, energy, finance, retail, etc.; third party rating, such as, for example, that provided by Morningstar, Inc. of Chicago, Ill.; and others.

The system then provides the library of criteria via a graphical representation to the user, as shown in block 210. In one embodiment, the criteria may each be represented as a single peg puzzle piece such as criteria NASDAQ 342, AMEX 344, technology 354, finance 352, etc. as shown in FIG. 3. In one embodiment, the criteria may be provided graphically in sets or groups. For example, groupings such as exchange/index 314, fundamentals 316, and community 318 may be provided, as shown in FIG. 3. The exchange/index group may include the NASDAQ 342, AMEX 344, NYSE, S&P 500, Russell 2000, etc. This group may also include pertinent sectors such as technology 354, energy, finance 352, retail, etc. The fundamentals may include capitalization such as large, middle or md. cap 362, and small; and well-known metrics such as beta, price to earnings ratio, percentage increase in share price over a particular period of time, etc. Community may include those securities selected as favorites or otherwise preferred by other members of an on-line community, such as RyanJ 366. In one embodiment, the community could be further broken down into sub-groups such as those other members of the community that are favorites of the particular user, such as favorites 320, those member of the community that meet a system definition as having hot hands, such as hot-hands 322, and those community members having certain characteristics, such as for example, greater than 20% annual portfolio return 324. In this embodiment, clicking on or otherwise activating favorites 320, hot-hands 322, greater than 20% annual portfolio return 324 creates a screen area or sub-window containing those community members meeting the particular criteria.

The system then receives an indication that a particular criterion is to be added to a filter, as shown in block 214. In one embodiment, a filter may have multiple levels or tiers, such as tier one 340, tier two 350 and tier three 360 of FIG. 3. The criteria added to each filer tier may be indicated by a user by a mouse click or other user input device and may then be added to the filter by dragging and dropping via the mouse or other input device or technique via well-known graphical user interface methods. In this embodiment, the single peg puzzle pieces may be placed over a horizontal bar such that a matching groove appears for the addition of the criterion to that tier by the user placing the pegged criterion into the groove at the particular tier. After a particular criterion has been added to a filter, the criterion is applied by the system, as shown in block 218. In one embodiment, this application of the filter is accomplished by software such as analyzer 108. The system then generates a list of items that meet al of the criteria in the filter, as shown in block 222. That is, in one embodiment, analyzer 108 applies all of the selected criteria to the population of items as a filter and generates a list of items that meet the criteria. In one embodiment, a running tally of the number of members of the population meeting the criteria defined by the filter is maintained and presented as both a list of items meeting the criteria and a raw total count of the number of items that meet the criteria. In one embodiment in which the items are securities, the list of items may be referred to as a portfolio as depicted as portfolio 370 and the raw total count by be referred to as total number of tickers 372.

The system may continue to receive criteria, apply the criteria and generate a list of items that meet the criteria of the filter by cycling through blocks 214, 218 and 222 until the user ceases adding additional criteria. As such, the list of items in the form of portfolio 370 and the raw total count in the form of total number of tickers 372 are continually updated. During such a cycle, a user of the system may apply criteria to any tier, or create an additional tier by prepending, inserting or appending the new tier. That the system provides a running portfolio also allows the user to view the effect of adding a particular criterion to the filter, where the criterion may be added to an existing tier or included in a new tier of the filter.

In one embodiment, the system may provide the user the capability to remove a filter criterion from any tier and view the resulting running portfolio. This removal may be temporary or may be permanent depending on the implementation or the user's input selection. In this way, a user may view the effect of the particular criterion on the results of the filter by comparing the portfolio both before and after removal of a criterion. For example, middle capitalization md. cap 362 of FIG. 3 may be removed so that the portfolio resulting from the removal may be viewed. In a related embodiment, a criterion may be removed and replaced with another criterion to compare the differing effects of the two criteria. For example, middle capitalization may be replaced with small capitalization such that md. cap 362 of FIG. 3 may be removed and replaced with sm. cap, not shown; or, for example, AMEX may be replaced with NYSE such that AMEX 344 of FIG. 3 may be removed and replaced with NYSE, not shown.

In yet another related embodiment, the system may allow the user to move a criterion between filter tiers. In this way, a user may view the effect of the particular criterion on the results of the filter by comparing the running portfolio before and after moving the criterion. For example, middle capitalization may be moved from one tier to another to see how it affects the portfolio, and more specifically, md. cap 362 of FIG. 3 may be moved from tier three 360 to tier two 350.

In one embodiment, clicking on different tiers of the filter will result in a display of the list of items at that particular tier by applying all criteria at that and all prior tiers to the population of items.

In one embodiment, the analyzer of the system applies a Boolean OR to those criteria on a same tier of the graphical representation. In one embodiment, the analyzer of the system applies a Boolean AND to the different tiers of the filter. For example, the result of tier one 340 depicted in FIG. 3 are those securities listed on the NASDAQ and AMEX exchanges. When criteria limiting the results to those stocks in the finance sector 352 or the tech sector 354 are applied as indicated by the user in tier two 350, the result includes those technology and finance stocks from the AMEX and NASDAQ exchanges. Tier three 360 further filters the population of all securities to those that are mid cap 362 or are in a portfolio of RyanJ 366. The result listed in the running portfolio 370 includes those stocks traded on the NASDAQ or the AMEX which are in the finance or technology sectors, and which are mid cap or are in a portfolio of RyanJ. In this example, there are sixty-two securities that result from the application of the totality of this filter.

According to other embodiments, a user can benefit from using the graphical user interface method of applying filters based on criteria pertinent to a population of items when there is any large population of items from which a user desires to select a subset, such as when the population of items is school classes, a parts inventory, an accessories inventory, a grouping of recipes, a list of encyclopedia articles, magazine article, newspaper articles, and the like.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
    defining a library of available criteria to be used in filtering a population of items to identify items of interest, each criterion having a graphical representation;
    receiving a selection of at least one of the criteria to be applied to the population as a filter;
    accepting an indication of a tier of the filter to which a selected criterion is to be associated;
    identifying a list of items of interest satisfying a current set of criteria defining the filter; and
    displaying a graphical representation of the filter while the filter is constructed.

2. The method of claim 1 further comprising:
    including the selected criterion into the indicated tier such that a graphical representation of the selected criterion is merged with a graphical representation of the indicated tier in the graphical representation of the filter.

3. The method of claim 1 further comprising:
    applying a Boolean OR to those criteria on a same tier of the filter; and
    applying a Boolean AND to those criteria residing on different tiers of the filter.

4. The method of claim 1 further comprising:
    displaying a representation of the list of items of interest.

5. The method of claim 4 wherein identifying comprises:
    computing a tally of the list of items of interest.

6. The method of claim 5 further comprising:
    displaying the tally of the list of items of interest.

7. The method of claim 1 further comprising:
    receiving an indication of one of the tiers of the filter;
    identifying, in response to receiving, a group of items satisfying the filter at the indicated tier;
    displaying the group of items.

8. The method of claim 1 wherein the population comprises a group of securities.

9. The method of claim 1 wherein the library of available criteria comprises criteria derived from a community of investors.

10. The method of claim 1 wherein the library of available criteria comprises user customizable filter criteria.

11. The method of claim 1 wherein the library of available criteria comprises predefined criteria.

12. A machine readable medium having instructions stored thereon which when executed by a processor cause the processor to perform operations comprising:
    defining a library of criteria to be used in filtering a population of items to identify items of interest, each criterion having a graphical representation;
    receiving a selection of at least one of the criteria to be applied to the population as a filter;
    accepting an indication of a tier of the filter to which a selected criterion is to be associated;
    identifying a list of items of interest satisfying a current set of criteria defining the filter; and
    displaying a graphical representation of the filter while the filter is constructed.

13. The machine readable medium of claim 12 in which the instructions cause the processor to perform operations further comprising:

including the selected criterion into the indicated tier such that a graphical representation of the selected criterion is merged with a graphical representation of the indicated tier in the graphical representation of the filter.

14. The machine readable medium of claim 12 in which the instructions cause the processor to perform operations further comprising:

applying a Boolean OR to those criteria on a same tier of the filter; and applying a Boolean AND to those criteria residing on different tiers of the filter.

15. The machine readable medium of claim 12 in which the instructions cause the processor to perform operations further comprising:

displaying a representation of the list of items of interest.

16. The machine readable medium machine readable medium of claim 12 wherein the population comprises a group of securities.

17. The machine readable medium of claim 12 in which the instructions cause the processor to perform operations further comprising:

receiving an indication of one of the tiers of the filter;

identifying, in response to receiving, a group of items satisfying the filter at the indicated tier;

displaying the group of items.

\* \* \* \* \*

UNITED STATES PATENT AND TRADEMARK OFFICE
CERTIFICATE OF CORRECTION

PATENT NO.            : 7,080,328 B2
APPLICATION NO.  : 09/821504
DATED                   : July 18, 2006
INVENTOR(S)          : Sawyer It is certified that error appears in the above-identified patent and that said Letters Patent is hereby corrected as shown below:

On the title page, in field (74), in "Attorney, Agent, or Firm", in column 2, line 2, after "Kluth" insert -- , --.

Column 3, line 18, delete "a in" insert -- in a --, therefor.

Column 8, lines 2-3, in Claim 16, after "machine readable medium" delete "machine readable medium". (Second Occurrence)

Signed and Sealed this

Twenty-first Day of November, 2006

JON W. DUDAS
*Director of the United States Patent and Trademark Office*